E. M. HEYLMAN.
TRANSMISSION MECHANISM FOR AUTOMOBILES.
APPLICATION FILED FEB. 17, 1909.

1,032,003.

Patented July 9, 1912.

4 SHEETS—SHEET 1.

Witnesses:

Inventor:
Edward M. Heylman
By:— Peirce & Fisher
Att'ys.

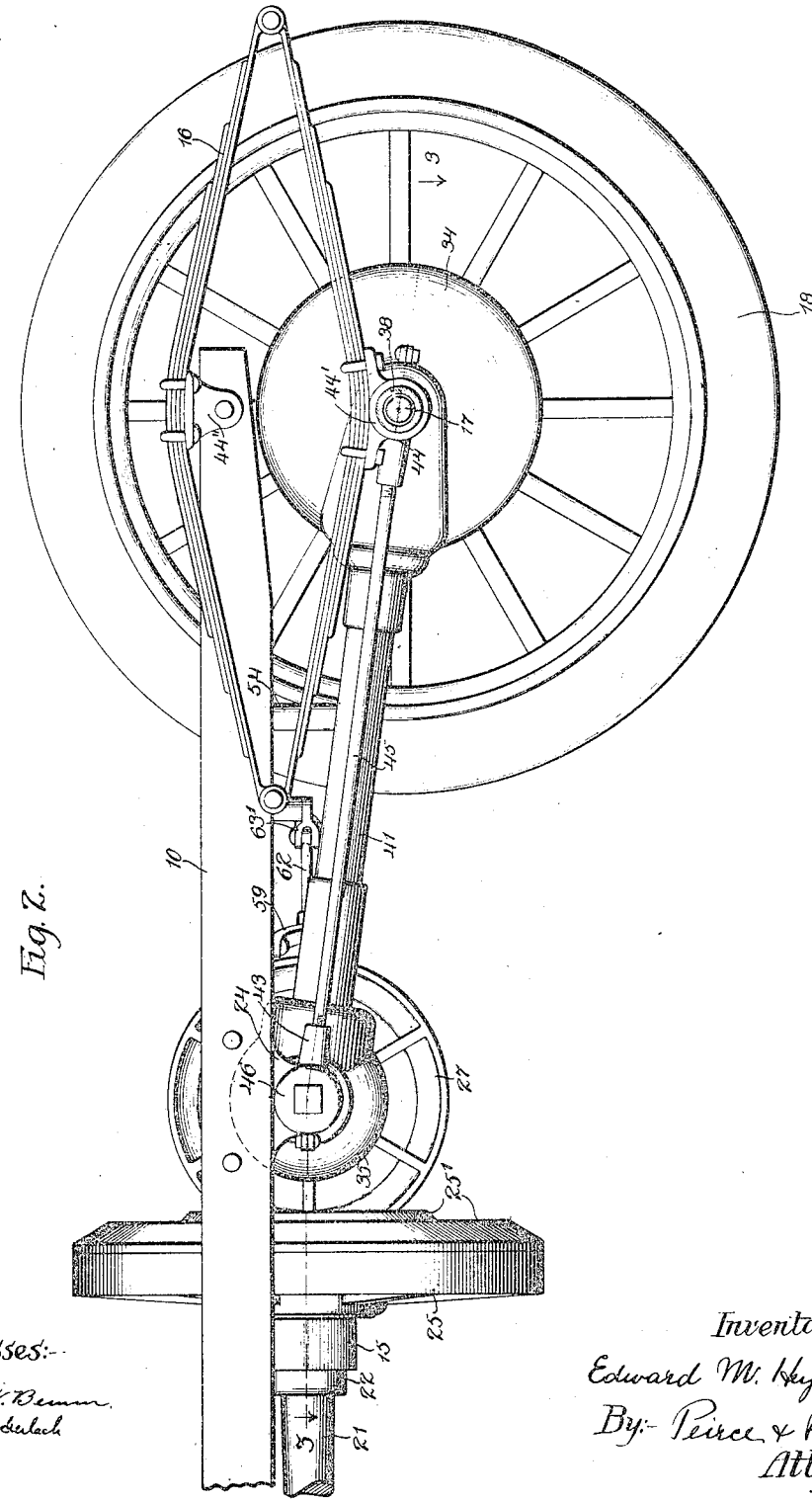

E. M. HEYLMAN.
TRANSMISSION MECHANISM FOR AUTOMOBILES.
APPLICATION FILED FEB. 17, 1909.

1,032,003.

Patented July 9, 1912.
4 SHEETS—SHEET 3.

Witnesses

Inventor:—
Edward M. Heylman
By Pierce & Fisher
Attys.

E. M. HEYLMAN.
TRANSMISSION MECHANISM FOR AUTOMOBILES.
APPLICATION FILED FEB. 17, 1909.
1,032,003.
Patented July 9, 1912.
4 SHEETS—SHEET 4.
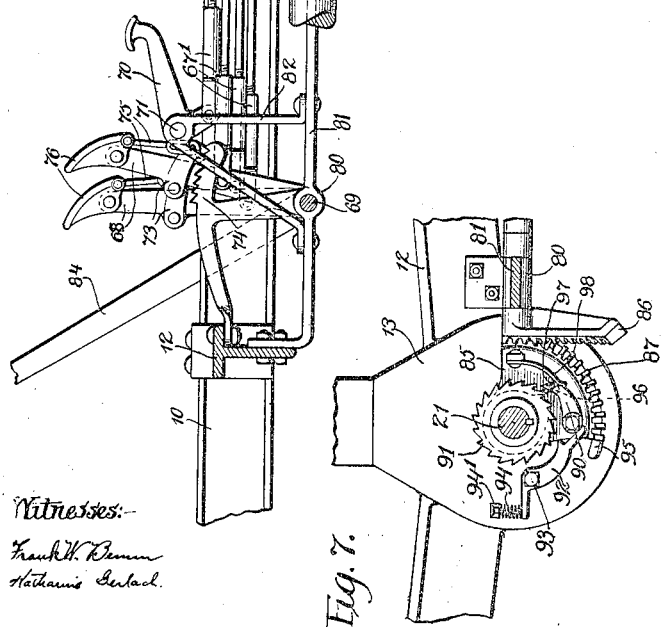
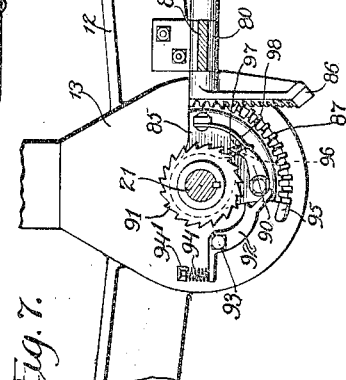
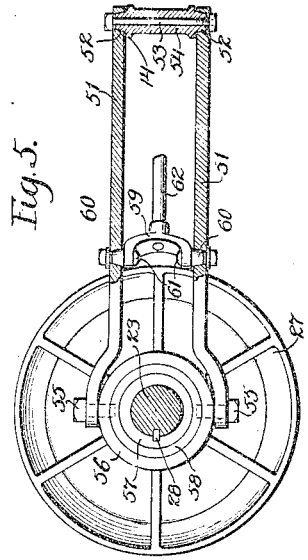
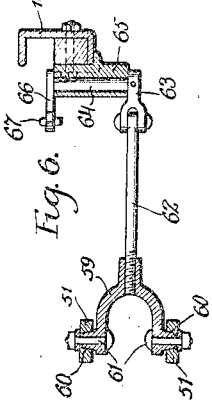
Inventor:—
Edward M. Heylman
By Peirce & Fisher
Att'ys.

UNITED STATES PATENT OFFICE.

EDWARD M. HEYLMAN, OF JANESVILLE, WISCONSIN.

TRANSMISSION MECHANISM FOR AUTOMOBILES.

1,032,003.  Specification of Letters Patent.  Patented July 9, 1912.

Application filed February 17, 1909. Serial No. 478,454.

*To all whom it may concern:*

Be it known that I, EDWARD M. HEYLMAN, a citizen of the United States, and a resident of Janesville, county of Rock, and State of Wisconsin, have invented certain new and useful Improvements in Transmission Mechanism for Automobiles, of which the following is a specification.

The invention seeks to provide an improved frictional transmission mechanism by which the power developed by the engine or motor of an automobile can be more effectively applied to the wheel axle thereof than with frictional transmission mechanisms heretofore employed and in which the wear upon the friction surfaces is materially reduced.

The invention also seeks to provide a simple and effective form of frictional transmission mechanism comprising a set of beveled or conical friction wheels arranged to vary the speed of the automobile and drive it rearwardly as well as in the forward direction, the parts of the transmission mechanism being so arranged that it can be effectively and quickly controlled by a set of levers or foot-pedals, one for each speed ahead and one or more for driving the automobile backwardly.

Further objects of the invention are to provide a simple form of transmission connection between the driving mechanism and the wheel axle of the automobile to which the power is applied, and to provide an improved starting mechanism.

With these and other objects in view, the invention consists in the features of improvement hereinafter set forth, illustrated in the accompanying drawings and more particularly pointed out in the appended claims.

Figure 1:
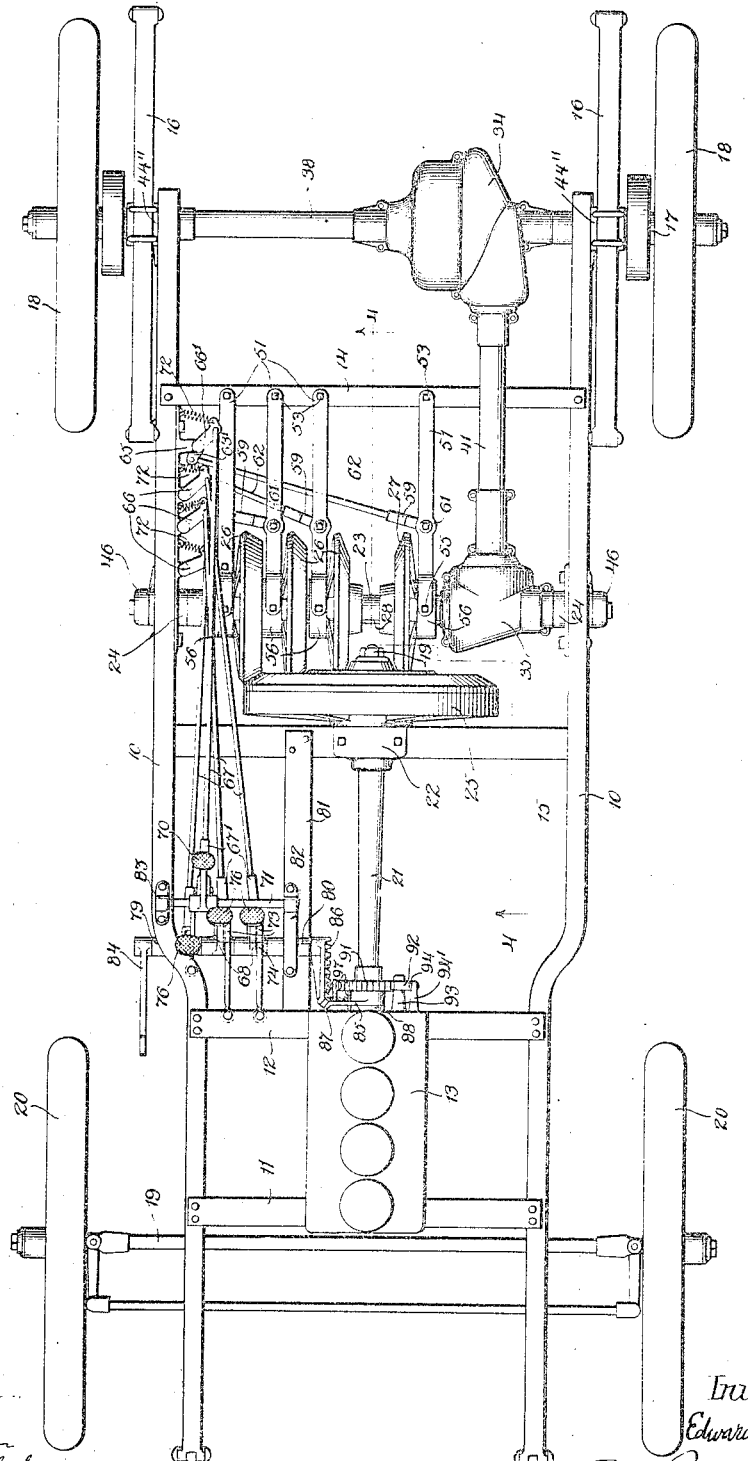
Figure 5:
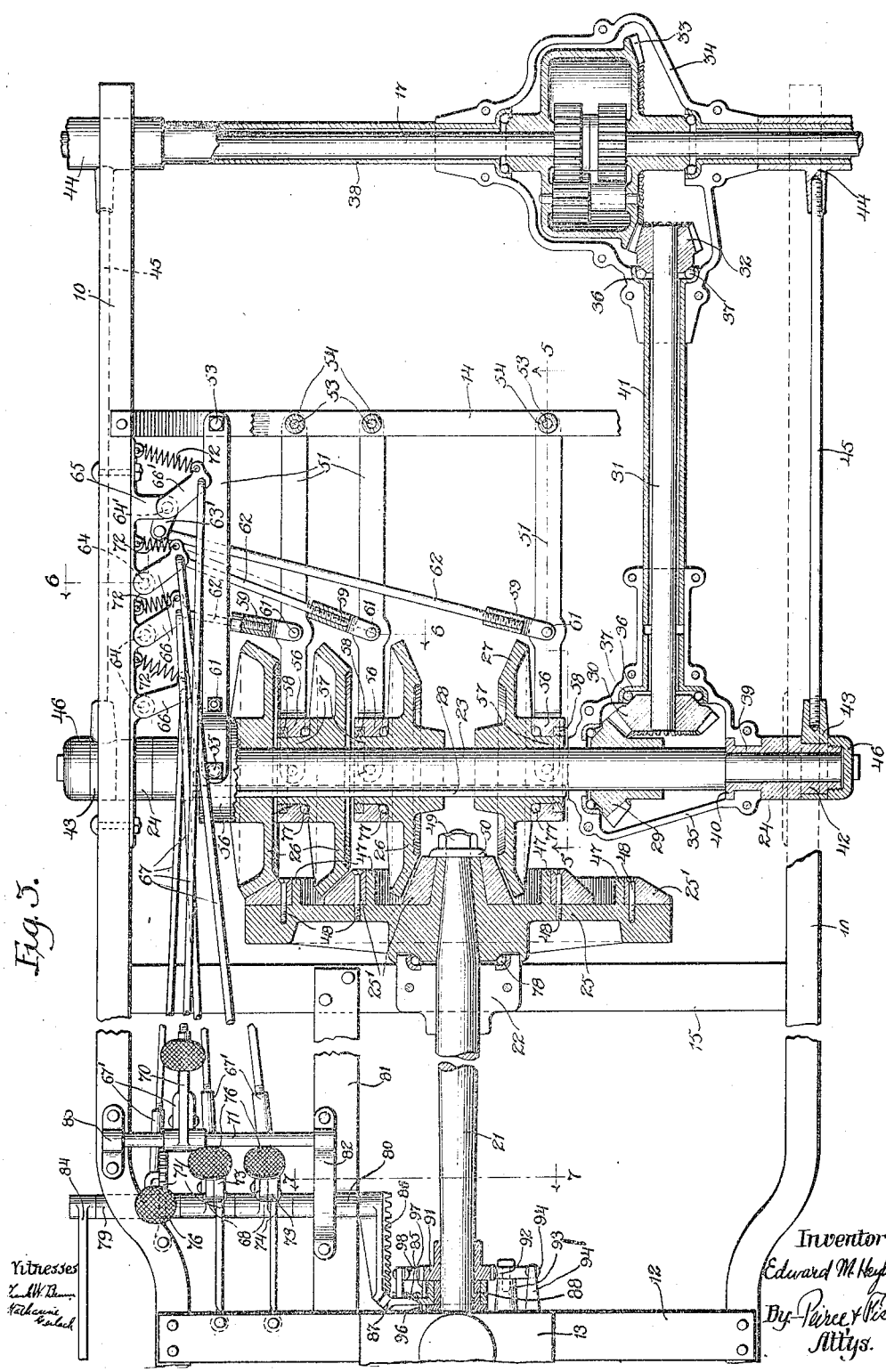

In the drawings Figure 1 is a plan view of the automobile frame or chassis with the improved transmission mechanism applied thereto. Fig. 2 is an elevation on an enlarged scale of the rear portion of the automobile frame showing the transmission mechanism; Fig. 3 is a plan view on an enlarged scale with parts shown in section on the line 3—3 of Fig. 2; Fig. 4 is a vertical section on the line 4—4 of Fig. 1; Figs. 5, 6 and 7 are detail sections on the lines 5—5 6—6 and 7—7 respectively of Fig. 3.

The frame of the automobile comprises the side-bars 10 that are connected at their forward ends by the transverse supports 11 and 12 for the engine or motor 13. Adjacent their rear ends, the side-bars 10 are connected by a cross-member 14 and intermediate their ends they are connected by a transverse bar 15. The frame is supported by springs 16 from the rear axle 17 which carries the traction wheels 18, and is similarly supported from the front axle 19 to which the steering wheels 20 are connected.

The engine drive shaft 21 extends longitudinally of the frame and is journaled at its forward end in suitable bearings formed in the frame or casing of the engine 13. At its rear end, it is journaled in a bearing 22 fixed to the cross-bar 15. A transverse counter-shaft 23 extends across the rear end of the engine drive shaft 21 and is journaled at its ends in bearings 24 fixed to the side-bars 10. The drive shaft 21 and counter-shaft 23 are so arranged that their axes lie in the same plane and at right angles to each other. Coöperating pairs of beveled friction members are interposed between the drive shaft 21 and the counter or driven shaft 23 to rotate the latter at different speeds and in opposite directions. The friction drive members upon the engine shaft 21 are preferably all formed upon a common wheel or disk 25 which, in the form shown, is provided with three friction rings 25'. The counter shaft 23 is provided with a set of three beveled friction wheels 26 which are arranged on one side of the center of the driving friction wheel 25 and are arranged to engage respectively with the friction rings 25' thereof. The counter shaft 23 is also provided with a friction wheel 27 which is opposed to the friction wheels 26 and is arranged on the opposite side of the center of the driving wheel 25 and is arranged to engage the innermost ring 25' thereof. A key 28 connects the friction wheels 26 and 27 to the transverse counter shaft 23, so that the latter rotates with the friction wheels, but the friction wheels 26 and 27 can be shifted longitudinally to a slight extent along the shaft 23 into and out of engagement with the friction rings 25' of the drive wheel 25. By means of the friction wheels 26, the shaft 23 is driven at different speeds in one direction, and by means of the friction wheel 27, the direction of movement of the counter shaft 23 may be reversed.

A beveled gear 29 (see Fig. 3) is fixed to one end of the transverse counter shaft 23 and meshes with a beveled gear 30 fixed upon the forward end of a longitudinally extending transmission shaft 31. A beveled gear 32 fixed to the rear end of the transmission shaft, meshes with the teeth of the master gear 33 of a suitable differential gear mechanism that is connected to the separate sections of the rear axle 17. A split gear casing 34 surrounds the compensating gearing and the gear 32 upon the rear end of the transmission shaft 31. A split gear casing 35 surrounds the intermeshing beveled gears 29 and 30. These gear casings are provided with bearings for the transmission shaft which are preferably in the form of ball-races 36 wherein are arranged rows of balls 37 that are adapted to engage cones formed upon the back faces of the beveled gears 30 and 32. The gear casing 34 is fixed upon the tubular casing 38 surrounding the rear axle but the gear casing 35 is swiveled upon the counter shaft 23, so that the rear axle is free to rise and fall relatively to the frame without interfering with the transmission of power thereto from the counter shaft 23. One end of the gear casing 35 engages a reduced extension 39 upon the inner end of the adjacent bearing 24 for the counter shaft 23. This extension is provided on its inner end with a flange 40 which holds the gear casing against lateral movement upon the shaft 23. The transmission shaft is surrounded by a casing sleeve 41 which is fixed to the casing 34, but which is free to swivel within the gear casing 35, to permit a rocking movement of the rear axle, as when one of the wheels thereon goes over an obstruction or into a depression.

The outer end of each of the bearings 24 for the counter shaft 23 is provided with a reduced extension 42 upon which is swiveled a coupling member 43. A similar coupling member 44 is fixed to the saddle blocks 44' upon each end of the tubular casing 38 and brace rods 45 are screw threaded at each end into extensions on the coupling members 43 and 44. These brace rods hold the rear axle at all times at the same distance from the counter shaft 23 so that, while the rear axle is free to move, power will, at all times, be properly transmitted thereto through the medium of the shaft 31 without jamming or binding the transmission gearing. It should be noted that the construction obviates the necessity of using a universal coupling or knuckle. Caps 46 threaded upon reduced, outer end portions of the bearings 24, hold the coupling members 43 in place and prevent the entrance of dirt into the bearings.

The friction disk and balance wheel 25 is provided on its rear face with a series of annular flanges 47 against which the beveled, friction rings 25' abut. These friction rings are formed of paper, fiber, leather, or like suitable friction material, and are removably held in place so that they may be renewed. Any suitable means may be employed for removably holding these rings in position. In the construction shown, the two outer rings are held in place by screws 48, while the inner ring is held in position by the nut 49 and washer 50 which hold the wheel 25 on the shaft 21. The beveled friction wheels 26 and 27 on the counter shaft 23 are formed of aluminum or other metal adapted to make good friction contact with the friction rings 25'. By forming these wheels of light metal, such as aluminum, the momentum of the moving parts, which must be arrested in stopping the machine, is quite small.

The beveled wheels 26 and 27 are thrown into and out of engagement with the friction ring 25 by a set of shifter arms. Each of these shifter arms comprises upper and lower bars 51, the rear ends of which extend above and below the cross member 14 and are provided with conical recesses for engaging cone bearings 52 thereon. Bolts 53 extend through the ends of the arms 51 and through sleeves 54 formed on the cross member 14 and secure the shifter arms 51 thereto. The front ends of the arms 51 are connected by pivot bolts 55 to rings 56 mounted upon the hubs 57 of the friction wheels 26 and 27. The rings 56 are held in place upon reduced portions of the hubs 57 by collars 58 threaded on the ends of the hubs and seated within recesses in the rings, as shown in detail in Fig. 3. A yoke 59 is pivotally connected to each pair of shifter arms 51. These yokes, as shown in Figs. 5 and 6, are preferably provided with conical bearings 60 engaging similarly shaped openings in the arms 51 and are connected to the arms by bolts 61. A set of rods 62 connect the yokes 59 with arms 63 upon the lower ends of a series of vertical rock-shafts 64. These rock-shafts are journaled in a suitable bracket 65 secured to one of the side-bars 10 of the machine and are provided at their upper ends with arms 66.

The arms 66 and 63, which are connected to the three beveled wheels 26 that drive the machine in forward direction at different speeds, are arranged in line, or one above the other. The arms 63' and 66' which are connected to the reversing beveled wheel 27, extend in opposite directions from the short rock-shaft 64', as shown in Fig. 3. The arms 66 are connected by a set of forwardly extending rods 67 to three foot-levers 68 pivotally mounted upon a shaft 69 at the forward portion and at one side of the machine frame. The arm 66' is connected by a similar rod 67 to one arm of a bell-crank foot-lever 70 that is pivotally mounted upon a shaft 71. The arms on the short, vertical rock-shafts 64 and the rods 62 form toggle levers for operating the shifter hubs 57 of the friction wheels 26 and 27. A set of springs 72 extending between the bracket 65 and the arms 66 and 67 normally hold the toggles away from dead center position and the friction wheels 26 and 27 out of engagement with the rings 25' of the friction disk or wheel 25. The driver of the machine, by pressing on any one of the foot-levers 68 or the foot-lever 70, can move any one of the toggles toward dead center position and thereby force the corresponding beveled wheels firmly into contact with one of the friction rings on the disk 25. The foot-levers 68 control the beveled wheels 26 which drive the machine ahead at different speeds, while the foot-lever 70 controls the reversing beveled wheel 27.

Each of the foot-levers 68 is provided with a locking dog 73 which is pivoted thereto and which is arranged to engage beveled teeth formed upon a fixed segment 74. This dog 73 is connected by a pin and slot connection to the lower end of a link 75 which is connected at its upper end to a foot-piece 76 pivoted upon the end of the corresponding lever 68. By placing his foot upon one of the pieces 76, the operator can not only shift the lever 68, but can also rock the foot-piece to throw the corresponding locking dog or latch 73 into and out of engagement with the teeth of the corresponding segment 74. By this means, any one of the beveled wheels 26 can be shifted into engagement with the corresponding ring 25' on the driving friction wheel and locked into engagement therewith, and it is not necessary that the operator should keep his foot upon the controlling lever. The foot-levers are always within easy reach of the operator and can be readily and quickly controlled to set the transmission mechanism for driving the machine forwardly at any desired speed, or for driving the machine rearwardly, or for entirely disconnecting the transmission mechanism from the driving friction wheel 25 upon the engine shaft 21.

The rods 67 are preferably threaded at their forward ends into coupling members 67' that are in turn connected to the foot-levers 68 and 70, so that the length of the connections between the foot-levers and the arms can be adjusted. The rods 62 are also preferably adjustably threaded into the yokes 59. In this way, the connections between foot-levers and the friction wheels 26 and 27 may be adjusted to take up the wear upon the friction rings 25'. By adjusting the nuts on the bolts 52 and 61, wear upon the conical bearings 52 and 60 can be taken up so that there will be no looseness or lost play in the connections for setting the friction wheels into engagement with the driving friction disk. End thrust upon the friction wheels 26 and 27, is taken up by rows of anti-friction balls 77 interposed between the hubs of the friction wheels and the shifter rings 56. End thrust upon the driving friction wheel 26 is taken up by a ball-bearing 78 interposed between its hub and the shaft bearing 22. The conical friction surfaces of the wheels 26 and 27 and of the rings 25', are all struck from a common center at the intersection of the axes of the drive shaft 21 and counter shaft 23, so that there will be no slipping and wear between two contacting friction surfaces of these wheels, such as necessarily occurs in friction drive mechanisms heretofore employed in which a cylindrical friction wheel is shifted over the face of a flat friction disk to drive the machine ahead at different speeds and to reverse its direction of movement. This peculiar arrangement of beveled, friction drive members is a valuable feature of my invention, since a more effective driving contact between the same is thereby effected, and since the wear upon the friction faces is materially reduced. Moreover, by means of the separate controlling shifters, any one of the coöperating pairs of friction members may be quickly and easily thrown into operation as desired. The necessity of employing a clutch is obviated and the entire transmission mechanism is extremely simple and efficient. The heavy friction disk or wheel 25 serves as a fly-wheel for the engine, while the momentum of the light friction wheels 26 and 27 is small, and the moving parts can be easily and quickly arrested in stopping the machine.

The shaft 69 whereon the foot-levers 68 are mounted, is journaled at its ends in suitable bearings 79 and 80 fixed to the under side of the adjacent side-bar 10 and to a short, supporting bar 81 extending between the cross-supports 12 and 15. The shaft 71 which carries the foot-lever 70 is journaled at its ends in a bracket 82 extending upwardly from the bar 81 and in a bearing 83 fixed to the upper edge of the adjacent side-bar 10. A starting lever 84 is fixed to the outer end of the shaft 69. The foot-levers 68 are loose on this shaft and its inner end is connected to a starting crank 85 in any suitable manner. In the form shown, the shaft is connected to the starting crank through the medium of two beveled segments 86 and 87, one of which is fixed to the inner end of the shaft and the other of which is fixed upon the starting crank. The starting crank 85 is journaled upon the bearing 88 of the engine shaft 21 and carries a pawl 90 which is arranged to engage the teeth of a ratchet wheel 91 that is fixed to the engine shaft. A retaining or holding pawl 92 is also arranged to engage the teeth of the ratchet 91. This pawl is mounted upon a fixed pivot pin or bolt 93 which, in the construction shown, is conveniently mounted upon the engine frame at one side of the engine drive shaft. A spring 94 extending between the tail of the holding dog or pawl 92 and a stop 94' on the engine frame tends to press the holding dog into engagement with the ratchet 91. In the normal position of the starting mechanism, the crank 85 rests against a stop 95 on the engine casing and in this position the pivoted end of the dog 90 engages the end of the retaining dog 92 and holds it out of engagement with the ratchet wheel 91. In this position also, the driving dog 90 is held out of engagement with the ratchet wheel by a fixed cam lug 96 on the bearing 88 which engages a pin 97 fixed to the driving dog 90 and extending through a slot in the starting crank 85.

The initial shift of the starting mechanism effected by means of the lever 84, will move the pin 97 on the driving dog 90 away from the fixed cam projection 96 so that the driving dog or pawl will be thrown into engagement with the ratchet wheel 91 by its spring 98. At the same time, the crank arm is moved away from the holding dog or pawl 92 which is mounted on a fixed pivot, so that its spring throws it into engagement with the ratchet wheel. The treadle movement of the starting crank 85 effected by the lever 84, will move the engine shaft through a portion of a revolution to start the engine. Inasmuch as the holding dog 92 positively locks the engine shaft against reverse movement while the starting mechanism is in operation, it forms an effective safety device and prevents the engine from imparting a forcible back thrust upon the starting mechanism which might injure the operator.

As soon as the engine is started, the starting lever 84 is returned to its normal position with the starting crank in engagement with the stop 95. In this position as stated, the driving dog or pawl 90 is held out of engagement with the ratchet wheel by the cam lug 96 and the holding dog 92 is also held out of engagement with the ratchet wheel. Both dogs are thus automatically thrown into operation when the starting lever is shifted from normal and remain in engagement with the ratchet wheel as long as the starting mechanism is operated but are automatically disengaged therefrom when the starting lever and mechanism connected thereto are restored to normal position. If desired, a spring could be provided for returning the starting mechanism to normal position and for holding it in such position. The controlling foot-levers and the starting lever are all within easy reach of the operator while in his seat on the machine, and can be readily and conveniently controlled therefrom.

It is obvious that numerous changes may be made in the details set forth without departure from the essentials of the invention.

I claim as my invention:—

1. In driving mechanism for automobiles, the combination with the frame, and driving and driven shafts mounted thereon at right angles to each other, of coöperating pairs of conical, friction drive-members comprising a friction wheel having a series of beveled faces fixed to one of said shafts and a series of beveled friction wheels keyed to and longitudinally shiftable on the other of said shafts, and a set of toggles for throwing said shiftable beveled wheels into and out of engagement with the friction members of said multiple faced wheel, substantially as described.

2. In driving mechanism for automobiles, the combination with the frame, and driving and driven shafts mounted thereon at right angles to each other, of coöperating pairs of conical, friction drive-members comprising a friction wheel having a series of beveled faces, fixed to said drive shaft, and a series of beveled wheels keyed to and longitudinally shiftable on said driven shaft, said shiftable beveled wheels being normally spring-held out of engagement with the friction members of said multiple-faced gear, a set of toggles for throwing said shiftable beveled wheels into operation, and a set of shift levers operatively connected to said toggles, substantially as described.

3. In driving mechanism for automobiles, the combination with the frame and longitudinally extending motor shaft, of a transverse counter shaft extending across the end of said motor shaft, a friction wheel mounted upon the rear end of the motor shaft and having a number of beveled friction rings on its rear face, a series of beveled friction wheels keyed to and longitudinally shiftable upon said counter shaft into and out of engagement with said friction rings, a series of shifter arms connected to said friction wheels, a set of controlling levers, links connecting said controlling levers and said shifter arms for throwing said friction wheels to operative position, and a set of springs connected to said links for throwing said friction wheels out of operation, substantially as described.

4. In driving mechanism for automobiles, the combination with the frame and longitudinally extending motor shaft, of a transverse counter shaft extending across the end of said motor shaft, a friction wheel mounted upon the rear end of the motor shaft and having a number of beveled friction rings on its rear face, a series of beveled friction wheels keyed to and longitudinally shiftable upon said counter shaft into and out of engagement with said friction rings, a set of toggles interposed between the frame and said shiftable friction wheels, controlling levers connected to said toggles for moving the same toward dead center position to throw said wheels into operation, and a set of springs connected to said toggles for normally holding said friction wheels in inoperative position, substantially as described.

5. In driving mechanism for automobiles, the combination with the frame and longitudinally extending motor shaft, of a transverse counter shaft extending across the end of said motor shaft, a friction wheel mounted upon the rear end of the motor shaft and having a number of beveled friction rings on its rear face, a series of beveled friction wheels keyed to and longitudinally shiftable upon said counter shaft into and out of engagement with said friction rings, a series of pivoted shifter arms, rings connected to said arms and to the hubs of said shiftable friction wheels, toggle links interposed between the frame and said shifter arms, a set of controlling levers and links connecting said controlling levers to said toggles, substantially as described.

6. In driving mechanism for automobiles, the combination with the frame and longitudinally extending motor shaft, of a transverse counter shaft extending across the end of said motor shaft, a friction wheel mounted upon the rear end of the motor shaft and having a number of beveled friction rings on its rear face, a series of beveled friction wheels keyed to and longitudinally shiftable upon said counter shaft into and out of engagement with said friction rings, a series of shifter arms connected to said shiftable friction wheels, a set of controlling levers, adjustable link connections between said controlling levers and said shifter arms, and springs connected to said links for holding said friction wheels in inoperative position, substantially as described.

7. In driving mechanism for automobiles, the combination with the frame and longitudinally extending motor shaft, of a transverse counter shaft extending across the end of said motor shaft, a friction wheel mounted upon the rear end of the motor shaft and having a number of beveled friction rings on its rear face, a series of beveled friction wheels keyed to and longitudinally shiftable upon said counter shaft into and out of engagement with said friction rings, a series of pivoted shifter arms connected to said friction wheels, adjustable toggle links interposed between the frame of the machine and said shifter arms, a set of controlling levers and links connecting said controlling levers to said toggles, substantially as described.

8. In driving mechanism for automobiles, the combination with the frame, driving axle and longitudinally extending motor shaft, of a counter shaft extending across the rear end of said motor shaft, speed varying and reversing, beveled friction wheels connecting said motor shaft and said counter shaft, a longitudinal transmission shaft, beveled gears connecting said transmission shaft to said axle and to said counter shaft, and a support whereon said transmission shaft is journaled, pivotally mounted on said axle and on said counter shaft, substantially as described.

EDWARD M. HEYLMAN.

Witnesses:
 FRANCES L. SCHLEGEL,
 GEORGE H. DRUMMOND.